United States Patent [19]

Ongaro

[11] 3,862,570
[45] Jan. 28, 1975

[54] TIRE SYMMETRY MEASURING METHOD AND SYSTEM

[75] Inventor: Theodore Ongaro, Columbus, Ohio

[73] Assignee: Ongaro Dynamics, Inc., Columbus, Ohio

[22] Filed: Jan. 26, 1973

[21] Appl. No.: 326,592

[52] U.S. Cl. .................................... 73/146, 73/459
[51] Int. Cl. ..................... G01m 17/02, G01m 1/16
[58] Field of Search ................ 73/66, 459, 462, 146

[56] References Cited
UNITED STATES PATENTS

| | | | |
|---|---|---|---|
| 3,479,867 | 11/1969 | Tarpinian et al. | 73/146 |
| 3,631,716 | 1/1972 | Monajjem | 73/146 |
| 3,661,014 | 5/1972 | Ciampolini | 73/146 |
| 3,729,992 | 5/1973 | Lichtman | 73/146 |

Primary Examiner—James J. Gill
Attorney, Agent, or Firm—Cennamo Kremblas & Foster

[57] ABSTRACT

A tire symmetry measuring method and system having means for rotating a vehicle tire at peripheral velocities comparable to high operating speeds of an auto — against a road drum. The apparatus comprises a mechanical closed loop to maintain a fixed and parallel distance between the principal axis of the tire and the principal axis of the drum. A first and second pressure responsive device measure on each side of the tire the unbalance of the tires in two planes rotating at high r.p.ms. Independently — but simultaneously — another pair of pressure responsive devices — positioned at right angles and displaced 90° from the first pair of sensors — measure the radial forces of either side of the tire caused by the lack of uniformities under the actual loaded condition. In this way two independent and simultaneous closed-loop measuring systems are provided.

16 Claims, 4 Drawing Figures

PATENTED JAN 28 1975

3,862,570

SHEET 2 OF 2 ures. These inertial forces which increase the loaded radius support part of the load. Additionally due to this effect, change of mass distribution and stiffness of the tire will constantly vary the forces which effectively change the
TIRE SYMMETRY MEASURING METHOD AND SYSTEM

BACKGROUND

Prior to the development of smoother roads and super highways the automotive and tire industries were concerned simply with controlling the tire's static unbalance for excessive vibrations.

In more recent years the industries — at the consumers demand — have become concerned with "tire aesthetics." More specifically the problem pertaining to the effect of tire and wheel non-uniformity upon the sound and, more pronounced, the vibration of the vehicle.

The redesigned new highways of the last two decades has resulted in hard smooth surfaces. These new improved smooth roads greatly contributed to elimination of the road caused vibrations. The lawful speeds on todays modern highways are now in the order of 70 miles per hour creating new type of vibrations. Vehicle and tire manufacturers have recognized the need to find a solution to these vibrations and after considerable cooperative research, have defined vibrations as being caused by non-uniformities in tires.

Tire uniformity may be attributed to a multitude of factors in the manufacture of the tire introduced by human or mechanical errors, dimension irregularities, variations in stiffness, variations caused by storage under unsuitable conditions, and many other deviations. However, one factor is known for certain, no tire is perfectly uniform.

Not fully appreciated by the prior art is that these force variations create vibrations that synchronize with vehicle natural frequencies. These frequencies derived from tire non-uniformities have no fixed patterns from tire to tire, their distribution can vary in number and magnitude. They reside in the wheel fundamental rotating frequency. It is not uncommon to find frequencies up to the tenth order. This is the reason vibrations are more pronounced at some speeds than at others — and unfortunately at high cruising speeds.

The time during which these high frequency forces are developed, is extremely short. As an example, a vehicle with a forward speed of 60 miles per hour has a forward velocity of 88 feet per second which is equal to 1,056 inches per second. The area of tire periphery in contact with the road, known as the "tire patch," is momentarily stationary for the duration of 6 milliseconds. That is the equatorial arc area becomes tangential and parallel in contact with the road in 1 millisecond, deflecting inwardly well over ⅜ - ½ inch and remains tangentially flat for the duration of less than 6 milliseconds. Then upon moving away from the surface of the road the rear end of the patch returns to the periphery circular form. The patch area is vertically loaded by the weight which the wheel with its tire must support — this is known as the loaded radius. The loaded radius (distance from the spindle to the road surface) continuously increases as the wheel rotation speed increases.

The increase in loaded radius is due to the centrifugal forces generated by the respective angular velocities. These inertial forces which increase the loaded radius support part of the load. Additionally due to this effect, change of mass distribution and stiffness of the tire will constantly vary the forces which effectively change the tire rolling radius and resistance. That is, the change of the radius at any instant causes the spindle or axle center to generate an irregular parallel path along the wheel revolution as it rolls over the smooth road surface (actually lifting and lowering the spindle or axle). These force vibrations are not the type generated by the unbalanced centrifugal forces. These steady frequencies when they are sympathetic to some natural frequencies inherent in any vehicle, will generate high undesirable vibrations and noise. This effect is only present at high speeds and never at low speeds. No vehicle is free of this phenomena only some are less sensitive than others, even of the same make and model.

PRIOR ART

From a study of the published literature — patents and other publications — many and diverse attempts have been made to measure the non-uniformities of the tire. Generally these attempts comprised measuring the induced force variations. In other instances attempts were made to measure lateral as well as radial force variations. The prior art measuring systems, though analytically and mathmetically may be impressive, are practically of little or no value.

For many compelling reasons the prior art systems — when testing a tire - rotated the tire at ridiculously low r.p.ms. In most instances far below comparable speeds that are considered very slow. No prior art system is known to utilize the high rotation of the tire to simulate the high operable speeds of the vehicle on todays highways. These (low speed) low r.p.m. rotation systems, of course, completely ignored the forces created by the centrifugal force action that are present at high speeds.

The measured signals attributed to the radial forces, are in fact a complex and composite signal. Again, the prior art has made attempts to correct for the non-uniformities of the tires without understanding or knowing what was causing what. Simply the prior art has not been able to effectively utilize the measured data.

SUMMARY OF INVENTION

The preferred embodiment of the present invention overcomes the problem of vibrations encountered by vehicles on todays roads at high operating speeds by providing a closed loop mechanical system. The apparatus comprises a wheel rotatable at high r.p.m. under load, in this instance the load is a fixed distance drum. Two independent measuring systems simultaneously measure the radial forces and the horizontal forces created in the tire by the centrifugal force action. More specifically, a pair of sensors measures the loaded radii variance of each side of the vehicle tire whereas the other pair of sensors — positioned 90° from the first pair measures the dynamic unbalance of the tire in two planes. The measurements are continuous and simultaneous.

In the system of the invention the load applied to the wheels is equivalent to that the tire and wheel would normally support when mounted on a vehicle. The rate of revolution imparted to the tire is equivalent to that of the speed of the vehicle on a super highway i.e., 60–90 m.p.h. The tires are not preconditioned before test is performed.

OBJECTS

It is a principal object of the present invention to provide a new and total improved tire dynamic uniformity measuring method and system.

It is a further object to provide such a method and system to simulate the problems of non-uniformity of tires at normal vehicle operating loads and speeds encountered in actual use on todays highway.

Another object of the system and method of the invention is to provide more than one measurement and, wherein, the additional measurement is defined as the dynamic unbalance condition of the tire.

Another object of the invention is to provide apparatus that is operable at simulated high speeds of a vehicle under real heavy loads — to recreate the dynamic centrifugal forces without introducing error into the measurement indicative of force variations and unbalance.

Still another object of the invention is to provide a test system that utilizes a sensor instantaneously responsive without lag to reproduce electrically the centrifugal forces in the non-uniform tire as the tire is rotated at high angular velocities under load.

Other objects and features of the present invention will become apparent from the following detailed description when taken in conjunction with the drawings in which:

DETAILED DESCRIPTION OF DRAWINGS

Figure 3:
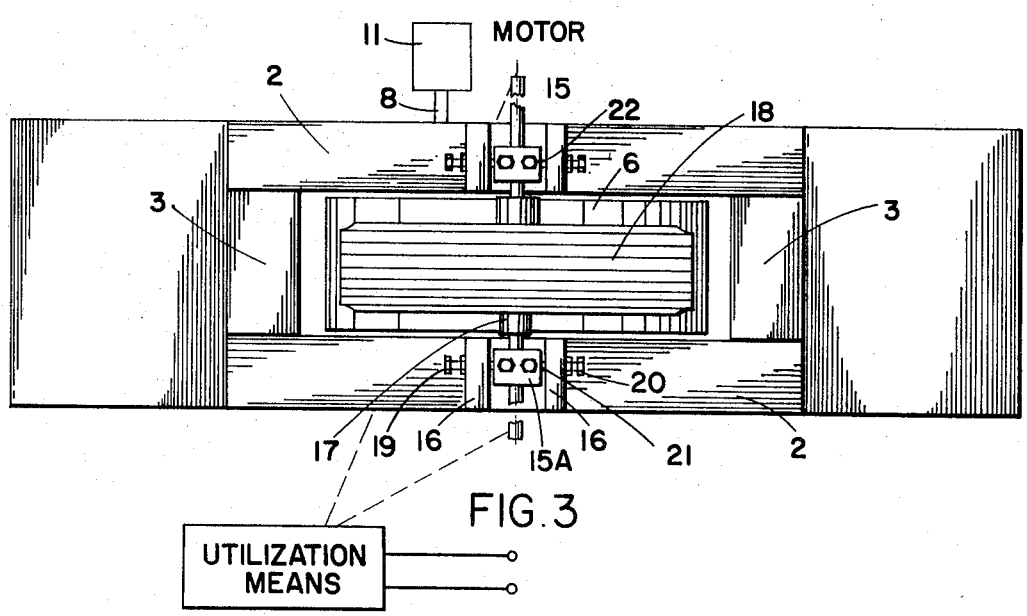
FIG. 3 is a top view of the embodiment of FIG. 1.
Figure 1:
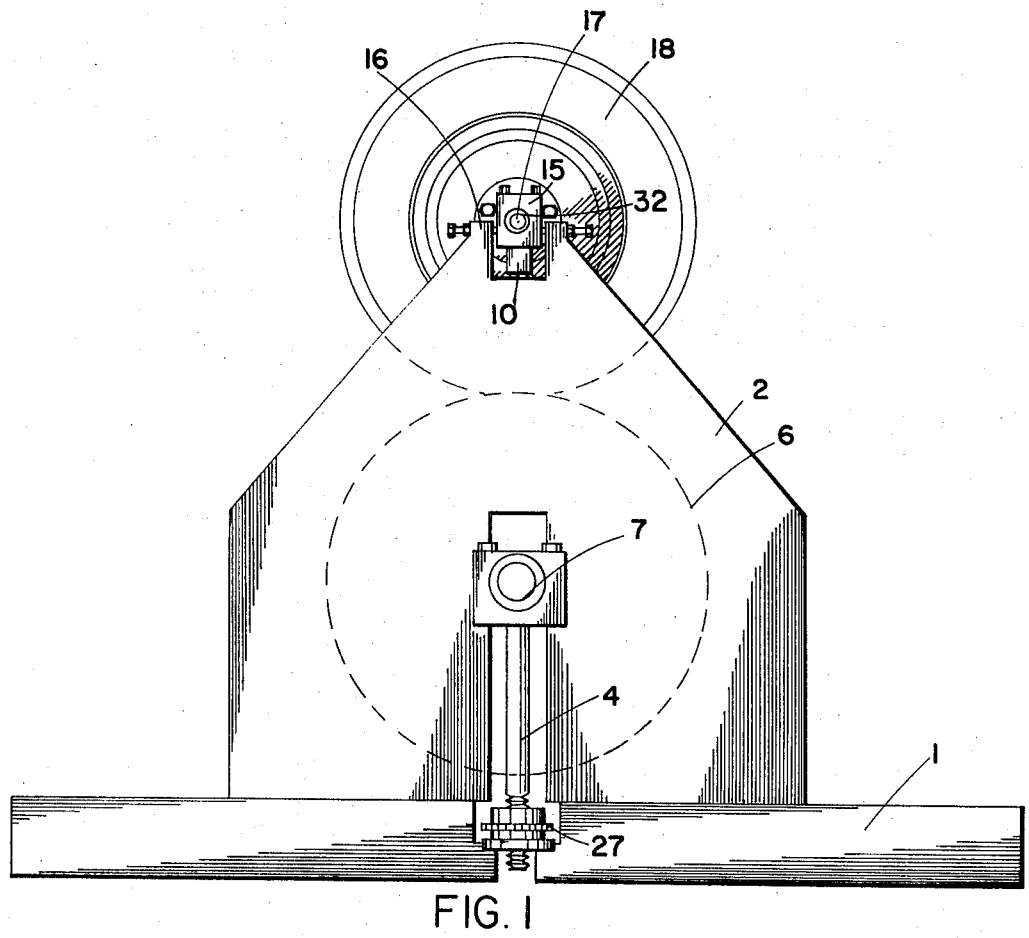
FIG. 1 is a side view of a mechanical schematic of a preferred embodiment.
Figure 2:
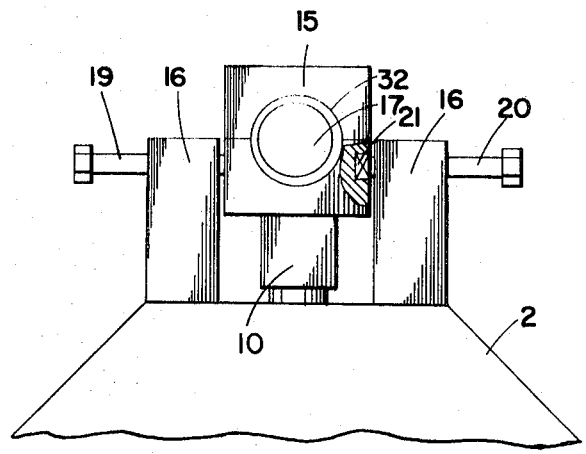
FIG. 2 is an expanded view of the wheel/tire portions of FIG. 1.

Referring now to the drawings, FIG. 1 is a side view and FIG. 3 is a top view of the preferred embodiment of the invention shown in mechanical schematic. Frame 2 is adapted to position and maintains the wheel 18 and the drum 6 in a fixed relationship. That is — and most importantly — the embodiment provides a closed loop between the wheel and drum support. The mechanical closed loop arrangement between the wheel/tire and drum — the fixed static load — and the particular uniqueness of the sensors to measure instantaneous minute changes of dynamic load blend into an operable arrangement heretofore not possible.

With specific reference to FIG. 1 the position of the drum 6 is varied relative to the wheel 18 by the twin precision screws and sprocket nut 27 arrangement in base 1. Once the position is set it remains without a measureable change. This variation of the drum position to the wheel/tire is the simulated application of the static load to the tire wheel assembly. The amount of load applied is as close as possible to that encountered in actual use of a wheel and tire assembly mounted on an automobile.

The shaft 7 rotatably supports the drum 6 and the shaft 7, in turn, is rotatably supported by bearings 5 on both sides by the frame 2. With reference to the top view of FIG. 3, shaft 7 is driven by special flexible drive 8 through motor 11. The motor 11 by necessity must have sufficient power (not less than 25 K.W.) to drive the drum 6 under heavy loads and at extremely high r.p.ms.

Figure 1A:
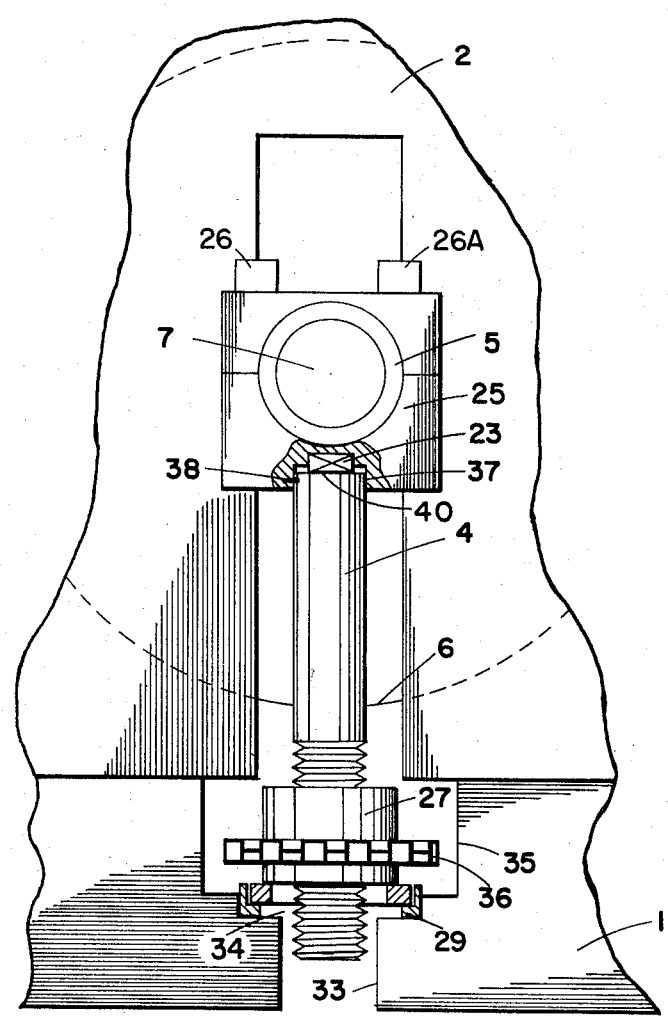
FIG. 1A is an expanded view of the drum portioning means of FIG. 1.

With particular reference to the enlarged view of FIG. 1A base 1, in line with the center of both upright arms of frame 2 has hole 33 with sufficient clearance to permit threaded screw shaft 4 to move therein freely. On the upper portion of base 1 hole 33 is counter bored with a larger diameter 34 to accomodate thrust bearing 29. A second portion of base 1 is further counter bored at 35 to accomodate precision threaded sleeve 27. The lower portion of threaded sleeve 27 is supported by the inner part of thrust bearing 29.

On the under side of its lower half pillow block 25 is bored to accomodate sensor 23. In addition, block 25 is counter-bored at 37 to accept screw shaft 4. This in turn supports bearing 40 by way of contact with load cell 23. The pillow block 25 is bolted by cap screws 26 and 26A. Sprocket 36 is assembled and becomes part of precision threaded sleeve 27.

With particular reference to the wheel/tire assembly shown in detail in the side view of FIG. 1 together with the enlarged top view of FIG. 3, two heavy rectangular columns 16 and 16A (shown in FIG. 3) are formed on the uppermost region of each upright frame member 2. These two columns are so spaced to accomodate pillow block members 15 which in turn rotatably support wheel/tire 18. The wheel/tire 18 and shaft 17 is supported in block 15 by bearing assembly 32.

Mounted in a first direction is a pair of sensors 21 and 22 positioned horizontally on each ends of shaft 17. These sensors (load cells) measure the dynamic centrifugal unbalance forces existing on each side of the tire 18.

With reference again to FIG. 1A there is shown, in a second direction — at right angles to the aforementioned first sensors direction and displaced 90° — a pair of sensors 23 and 24 positioned on either side of the drum 6 adjacent shaft 7. These second pair of sensors (load cells) measure the radial forces — as more fully described hereinafter.

It is stated above that the system is a mechanical closed loop and that the distance between the shafts 7 and 17 is fixed. In this respect the load cells or sensors 23 and 24 as shown in FIG. 3 would have only a static registrable force applied thereto in the absence of an anomaly between the tire 18 and drum 6. In the application of the static load to the wheel/tire assembly under test (by adjusting the precision elevating screws 4 and 4A) a force is applied to the sensors 23 and 24. This is a momentary force and as more fully described hereinafter the sensors will immediately return to a zero reading position. Once the load is applied and fixed the sensors will only record the dynamic cycling forces caused by the tire irregularities or non-uniformities.

The sensors 21, 22, 23 and 24 are those manufactured and marketed by P.C.B. Piezotronics, Inc., P.O. Box 331, Buffalo, New York 14225. These sensors are piezoelectric quartz crystals having excellent temperature range stability and withstand enormous forces without fracturing. These quartz crystals are of a very low Q, that is, having a ringing amplitude peak to peak of 5 to 15 percent. The quartz crystals (load cells) output have a linearity of better than 1 percent over their entire range, and can resolve plus or minus ½ pound force from ½ Hertz to several thousand Hertz, and can withstand several orders of overload. Its rigidity or stiffness to applied forces is 1 × 10 to the −8 inches per pound load. These load cells are particularly adaptable to the present invention.

In operation of the preferred embodiment and in carrying out the method of the present invention every contingency is met to put the system in an actual working environment. The tires need not be preconditioned before test. In that the actual load of a tire is different from a compact car, to a luxury car, to a truck etc., the load is determined for the tire's specific use. From this determination elevating screws 4 are moved in one direction or another to position drum 6 relative to wheel tire assembly periphery 18 to simulate the actual load it will eventually carry.

The load applied to the wheel periphery 18 by the drum 6 creates a tire "patch" — or sometimes referred to as "footprint" or "signature" — where the two meet. This tire patch is that which is created by the weight of the auto on its four wheels. In actual practice the tire patch approaches an ellipse with variations to its shape caused by the centrifugal action and lack of uniformities. In the simulated tire patch there is no general configuration since the entering and leaving of that particular portion of the tire into and out of the patch is that which causes the radial forces. It is the radial forces, that represent the tire irregularities and non-uniformities.

The first pair of sensors positioned on either side of shaft 7 of the drum 6 sense the composite force created radially. That is, any irregularity or non-uniformity in the tire will cause a force. This force is measured at a single point (on both sides of the tire) as the tire rotates through the tire patch.

The literature has recognized the existence of these disturbing radial forces and has measured — purportedly — these forces. In some instances corrective measures are taken from this measurement. However, any measure taken at best is a hit and miss proposition since this measurement is a composite measurement and just what it represents was not known.

But more significantly, is that the measurement of radial forces as done by the prior art is not a measurement of radial forces encountered by a tire, under load and under usual high speed operating conditions. The most fundamental thing overlooked by the prior art is the centrifugal force action. For instance, the resiliency of any tire will change considerably from one speed to another. Also the centrifugal forces in themselves will support to an extent the load. Accordingly, it is necessary to make a true radial force measurement, to rotate the tire at what would be an operating speed and actual load. Motor 11 is sufficient to impart such a rotation to shaft 7 of drum 6 applying a simulated load and angular velocity.

It is repeated that the frame 2 is a closed loop — that the distance between shaft 7 and 17, once positioned are parallel to less than 0.002 inches per foot and remain during the entire test. Therefore, it must be emphasized that the frame 2 base 1, blocks 3, shafts 7 and 17 in order to maintain their fixed position must be extremely rugged. There must be no deflection between one and the other. This in itself is not only extremely critical but has been overlooked in most other systems. In our overall system the frame, shafts, and drum are calculated, designed, and constructed with their first fundamental period residing well over 1,800 c.p.s.

As stated above the radial measurement is a composite and resultant signal force representing all effects caused by irregularities and non-uniformities. Therefore, to utilize the radial measurement resultant signals for corrective action may result in a better tire or may result in a worse tire.

It has now been found that the dynamic unbalance component of the system can be measured. This is done by simultaneously measuring the horizontal tire forces at a right angle relative to the radial force measurement and displaced 90° from each other. This dynamic unbalance force measurement can and is utilized to correct the tire for unbalance. The dynamic unbalance measurement signals are utilized together with the radial measurement resultant signals for corrective action. That is, the signals representative of true forces are utilized in modern computer techniques, to evaluate the tire anomolies.

Again it is emphasized that at the operating speeds of 60–90 m.p.h. of todays vehicle the vibrating forces created in the tire are not to be found at much lower speeds. The primary factor in creating these forces at these speeds and loads is the dynamic centrifugal action imposed on the tire. Every car has four wheels — it is then that the irregularities and non-uniformities react differently and when considered together with the resonant or natural periods residing in the vehicle itself, the overall and composite vibrations effect becomes most undesireable.

Although only a preferred embodiment of the apparatus is described together with the method it must be appreciated that departures may be had without departing from the spirit and scope of the invention.

What is claimed is:

1. Apparatus for simultaneously testing the symmetry and the non-uniformity characteristics of a vehicle wheel/tire under simulated actual static load and at speeds characteristic of 60–90 m.p.h., comprising:

a frame member, a first shaft member mounted in said frame for rotation therein, a drum mounted on said first shaft, a second shaft member mounted in said frame, said second shaft adapted to support said wheel/tire in a perpendicular plane and parallel to said drum and in contact with said drum, means for varying the amount of contact between said wheel/tire and said drum to thereby simulate the actual static load necessary for said tire and thereby simulate the tire patch, said wheel shaft and said drum shaft in said frame having a fixed parallel dimension once said varying means is in a fixed position to provide a closed loop system, means for rotating said drum at peripheral velocities comparable to auto speeds of 60–90 m.p.h., a first piezoelectric sensor positioned in a first direction relative to said first shaft to sense and measure the radial forces at said tire patch of said tire under said simulated actual load and said speed of a vehicle, a second piezoelectric sensor positioned in a second direction at right angles to said first direction and at 90° displacement from said first sensor — to sense and measure the dynamic unbalance forces caused by lack of symmetry of said tire simultaneously with said first sensor, and means for utilizing said first and second sensed measurements.

2. The apparatus of claim 1, wherein the said piezoelectric sensors are quartz crystals having a low Q.

3. The apparatus of claim 2, wherein said piezoelectric quartz has a rigidity in order of $1 \times 10^{-8}$ inches per pound of static load.

4. The apparatus of claim 1, wherein said first shaft is supported in said frame on either side of said drum.

5. The apparatus of claim 1, wherein said second shaft is supported in said frame on either side of said wheel.

6. The apparatus of claim 1, wherein said frame mechanically and statically supports said first and second shafts in said closed-loop.

7. The apparatus of claim 1, wherein said first sensor is positioned in said frame supporting said first shaft.

8. The apparatus of claim 1, wherein said second sensor is positioned in said frame supporting said second shaft.

9. The apparatus of claim 1, wherein said first sensor comprises a first and second piezoelectric load cell positioned on either side of said drum shaft.

10. The apparatus of claim 1, wherein said second sensor comprises a first and second piezoelectric load cell positioned on either end of said wheel shaft.

11. The method of simultaneously testing the symmetry and non-uniformity characteristics of a vehicle wheel/tire utilizing a drum to obtain simulated actual static load and speeds characteristic of 60–90 m.p.h. comprising steps of:

supporting said wheel/tire and said drum in a fixed distance closed loop arrangement upon parallel axles, varying the position of said drum to simulate a static load on said drum and thereby creating a tire patch, rotating said drum at peripheral velocities characteristic of 60–90 m.p.h. of an auto, measuring the radial forces exerted on said drum by said tire, measuring the dynamic unbalance forces of said wheel/tire, and utilizing said measurements.

12. The method of claim 11, wherein measuring said radial forces exerted on said drum by said tire further comprises utilizing a highly sensitive instantaneously responsive sensor, and positioning said sensor in a first direction relative to said drum.

13. The method of claim 12, wherein said measuring of said radial forces and said dynamic unbalance forces further comprises utilizing a highly sensitive and instantaneously responsive sensor, and positioning said sensor relative to said wheel in a second direction at right angles to said first direction.

14. The method of claim 13, wherein said positioning further comprises displacing said measuring of radial forces exerted on said drum by said tire 90° relative to said measuring of said radial dynamic and unsymmetrical forces.

15. The method of claim 11, wherein said measuring of said radial forces of said wheel/tire further comprises measuring said forces on either side of said drum.

16. The method of claim 11, wherein said measuring of said horizontal dynamic forces of said wheel/tire further comprises measuring said forces on either side of said drum.

* * * * *